INVENTORS
JAMES W. TAYLOR,
&
FRANK McKAY
BY
Mason, Fenwick & Lawrence
ATTORNEYS

Oct. 6, 1964 J. W. TAYLOR ETAL 3,151,544

PORTABLE DATA IMPRINTING APPARATUS WITH TILTABLE TYPE BARS AND WEB FEEDING MEANS

Filed Sept. 24, 1962 6 Sheets-Sheet 2

INVENTORS
JAMES W. TAYLOR
&
FRANK McKAY
BY Mason, Fenwick & Lawrence
ATTORNEYS

Oct. 6, 1964 J. W. TAYLOR ETAL 3,151,544

PORTABLE DATA IMPRINTING APPARATUS WITH TILTABLE TYPE BARS AND WEB FEEDING MEANS

Filed Sept. 24, 1962 6 Sheets-Sheet 3

INVENTORS
JAMES W. TAYLOR,
&
FRANK McKAY

BY Mason, Fenwick & Lawrence
ATTORNEYS

INVENTORS
JAMES W. TAYLOR
&
FRANK McKAY
BY
Mason, Fenwick & Lawrence
ATTORNEYS

Oct. 6, 1964 J. W. TAYLOR ETAL 3,151,544

PORTABLE DATA IMPRINTING APPARATUS WITH TILTABLE TYPE BARS AND WEB FEEDING MEANS

Filed Sept. 24, 1962 6 Sheets-Sheet 5

INVENTORS
JAMES W. TAYLOR
&
FRANK McKAY

BY Mason, Fenwick & Lawrence
ATTORNEYS

INVENTORS
JAMES W. TAYLOR,
&
FRANK McKAY
BY
Mason, Fenwick & Lawrence
ATTORNEYS

United States Patent Office 3,151,544
Patented Oct. 6, 1964

3,151,544

PORTABLE DATA IMPRINTING APPARATUS WITH TILTABLE TYPE BARS AND WEB FEEDING MEANS

James W. Taylor, Woodbridge, Va., and Frank McKay, Needham Heights, Mass., assignors to Farrington Business Machines Corporation, New Bedford, Mass., a corporation of Massachusetts Filed Sept. 24, 1962, Ser. No. 225,788
9 Claims. (Cl. 101—93)

The present invention relates in general to apparatus for advancing and mechanically printing a series of columns of plain language on roll or fan-fold paper.

One object of the invention is to provide a novel device which is simple in construction and operation for use in recording variable data such as money amounts, meter readings or other data which require human tally or enumeration and notation.

A further object of the invention is to provide a novel recording device of the character described in the preceding paragraph which is lightweight, compact, and portable to facilitate the gathering of variable data from many points in a geographic area or locality and to enumerate and list the variable data by mechanical imprinting.

In most data processing applications, the method of getting information into the data processing system is one of the most lengthy and tedious jobs of all. This is particularly true in data processingly systems in the public utility field to perform automatic billing operations, where the readings from various power meters, electric or gas, are the input medium and the criterion on which a customer is billed. While it has been recognized that great savings could be effected by resorting to automatic data processing equipment to perform such billing operations, the burden of this input task since the volume of customers is large and the job of entering the data is extremely large and time consuming, has discouraged widespread adoption of such billing systems by public utilities. Attempts heretofore to improve the system for entering data into billing operations have not met with noticeable success.

A further object of the invention is to provide a novel recording device which yields mechanical imprinting of variable data, such as money amounts, meter readings, and the like, of such quality and registration so as to enable further automatic processing of said variable data by means of character sensing equipment.

Other objects, advantages, and capabilities of the present invention will become apparent from the following detail description taken in conjunction with the accompanying drawings showing one preferred embodiment of the invention.

Figures 1, 7:
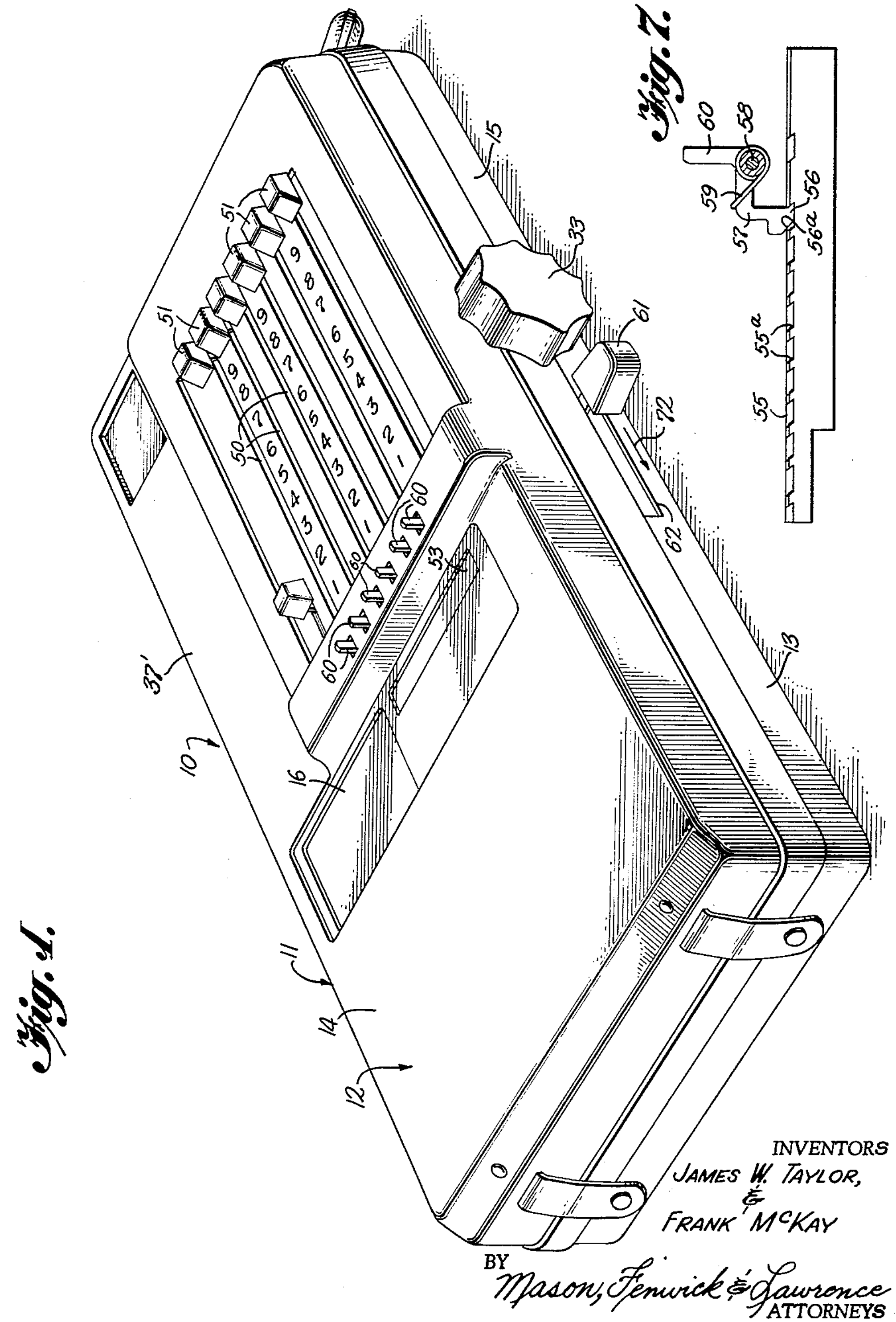
FIGURE 1 is a perspective view of data imprinting apparatus constructed in accordance with the present invention.
FIGURE 7 is a diagrammatic view of the imprinting bar adjusting components of the apparatus.
Figure 2:
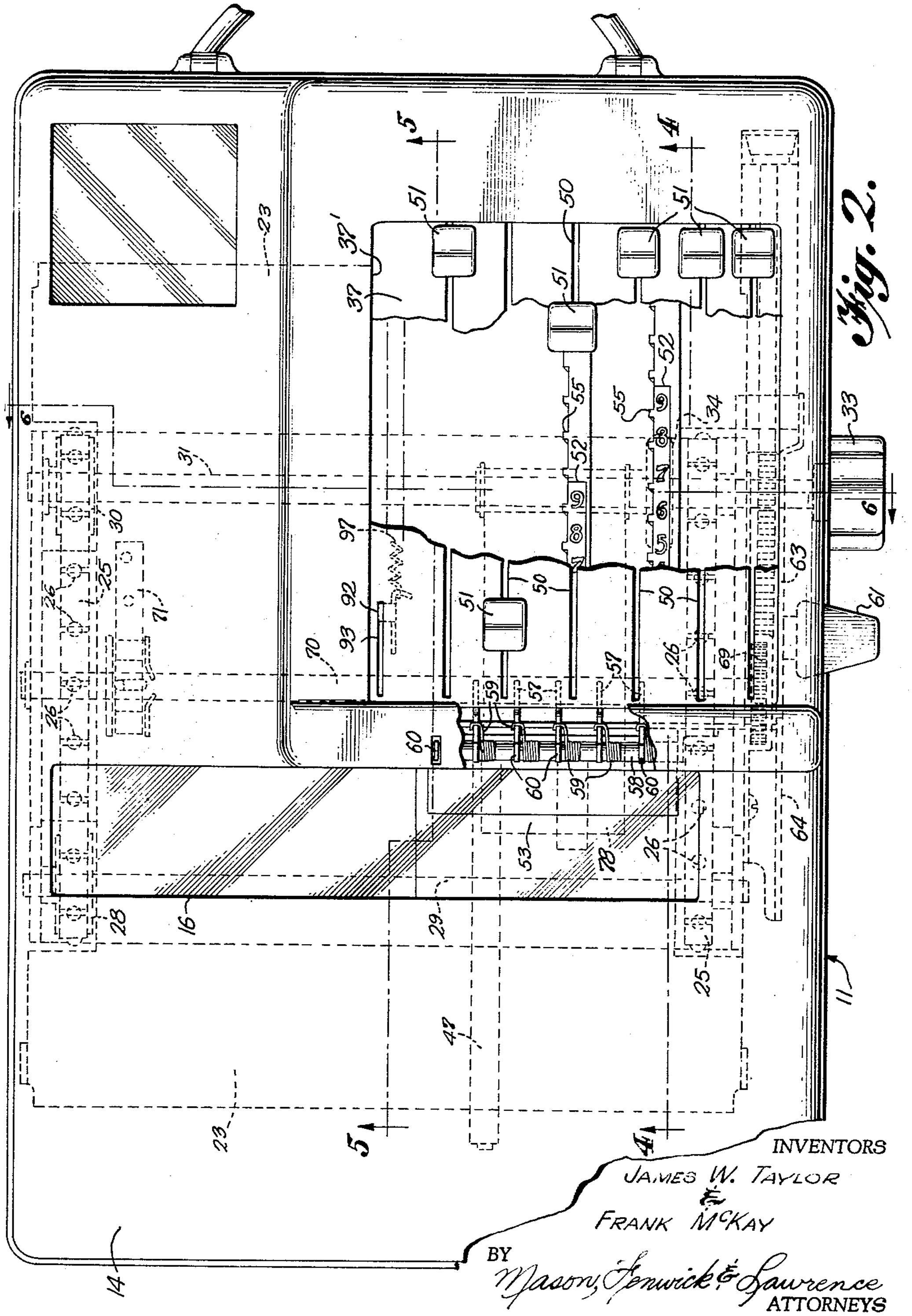
FIGURE 2 is a top plan view of the apparatus with the case broken away to reveal the internal construction of the apparatus.

The apparatus of the present invention may be generally characterized as a portable mechanical printing device for mechanically imprinting characters representative of meter readings or like variable data which require human notation on roll or fan-fold paper, which is incorporated in a compact arrangement within a case so that it can be readily transported. The unit, in order to facilitate the data recording operations, employs means for manually positioning, from a blank or non-digit position, accessible tabs projecting from slidable imprinting bars containing self-inking type strips which can be advanced columnarly with ease to a character position at the printing station in the case. In the event of an original setting error, each tab can be reset to the blank position and repositioned with equal ease to another position in its column before the beginning of the imprinting cycle. Detent means are provided for indexing the tab and slide bar mechanisms during the setting operation to hold each of the slide bars in any one of a plurality of discrete set positions so that the type in each column is properly registered in the printing station. In the event an error of printing is made, means are provided for indicating such an error, consisting of an error symbol positioned so that the symbol can be imprinted next to and on line with the erroneously printed data.

The unit is arranged to complete the entire printing cycle with one stroke of a manually actuated operator slide which actuates the printing mechanism and causes the imprinting bars to be reset to the blank position after printing. In order to transfer an imprint of the characters on the self-inking type strips at the printing station to the paper, an anvil is provided which is lifted by a compression spring under the anvil when the anvil is released by a suppressing cam at the proper cycle time, supplies appropriate pressure through the paper to the self-inked type characters to press the paper to the type and obtain transfer of ink to the paper. The unit also includes means for advancing roll or fan-fold paper through the printing station including a manual indexing knob connected to a paper feed mechanism and constructed for both forward and reverse motion. This is provided to allow repositioning of the roll or fan-fold of paper to any advance or previous position at will and at any time while the actuating lever is at rest position.

The casing is provided with a window to permit viewing of the data imprinted on the previous cycle and with window means for viewing preprinted data, if any, provided on the paper.

The specific description which follows will be directed to an exemplary embodiment designed for public utility meter reading applications, wherein the apparatus is provided with paper in continuous folded form on which pertinent data regarding the meter reader's route, such as the customer's name, account number, and address has been previously entered, as by a high speed printer. The meter reader must then imprint on the paper by means of the apparatus, the customer's meter reading in selected position, preferably on the same line with the account number which was previously listed by the high speed printer. The data can then be read by automatic character sensing equipment entering the meter reading itself and the account number into a computer system.

Referring now to the drawings illustrating one practical construction of the apparatus embodying the invention, there is shown a mechanical imprinting device, indicated generally by the reference character 10, which includes an outer case 11 of generally rectangular configuration formed of two sections 12 and 13, the upper section 12 having a major surface forming the front wall 14 of the case and the bottom section 13 having a major surface forming the rear wall 15 of the case. The sections 12 and 13 are fastened together at the lower and top ends by suitable releasable fastening means, such as leather strap fasteners, and a conventional carrying strap may be provided at the top end of the case.

A window 16 extending transversely of the case is provided in the lower central zone of the front wall 14 through the left-hand part of which preprinted data on the paper within the casing may be viewed and through the right-hand part of which the settings of the imprinting bars when they are adjusted and the data imprinted on the paper following the end of the imprinting cycle may be viewed.

The paper on which the meter reading is to be imprinted, which carries the preprinted data, is indicated by the reference character 17 and in this embodiment is of the fan-fold type. The case 11 is provided at the lower end with a first storage chamber forming a supply compartment 18 for the paper and at the upper end with a second storage chamber forming a receiving compartment 19 for the paper. In specific embodiments wherein fan-fold paper is used, open-cornered boxes 18', 19' having a flat bottom panel and upwardly folded side and end members formed from an integral piece of sheel metal may be used to facilitate storage of the paper.

The paper 17 is fed through a printing station, indicated by the reference character 20, between a lower paper guide 21 supported on a bottom frame 22 and an upper paper guide 23 supported on a top frame 24, the frame 22 being suitably fixed to the case 11 and the frame 24 fixed to the frame 22.

Figures 4, 5:
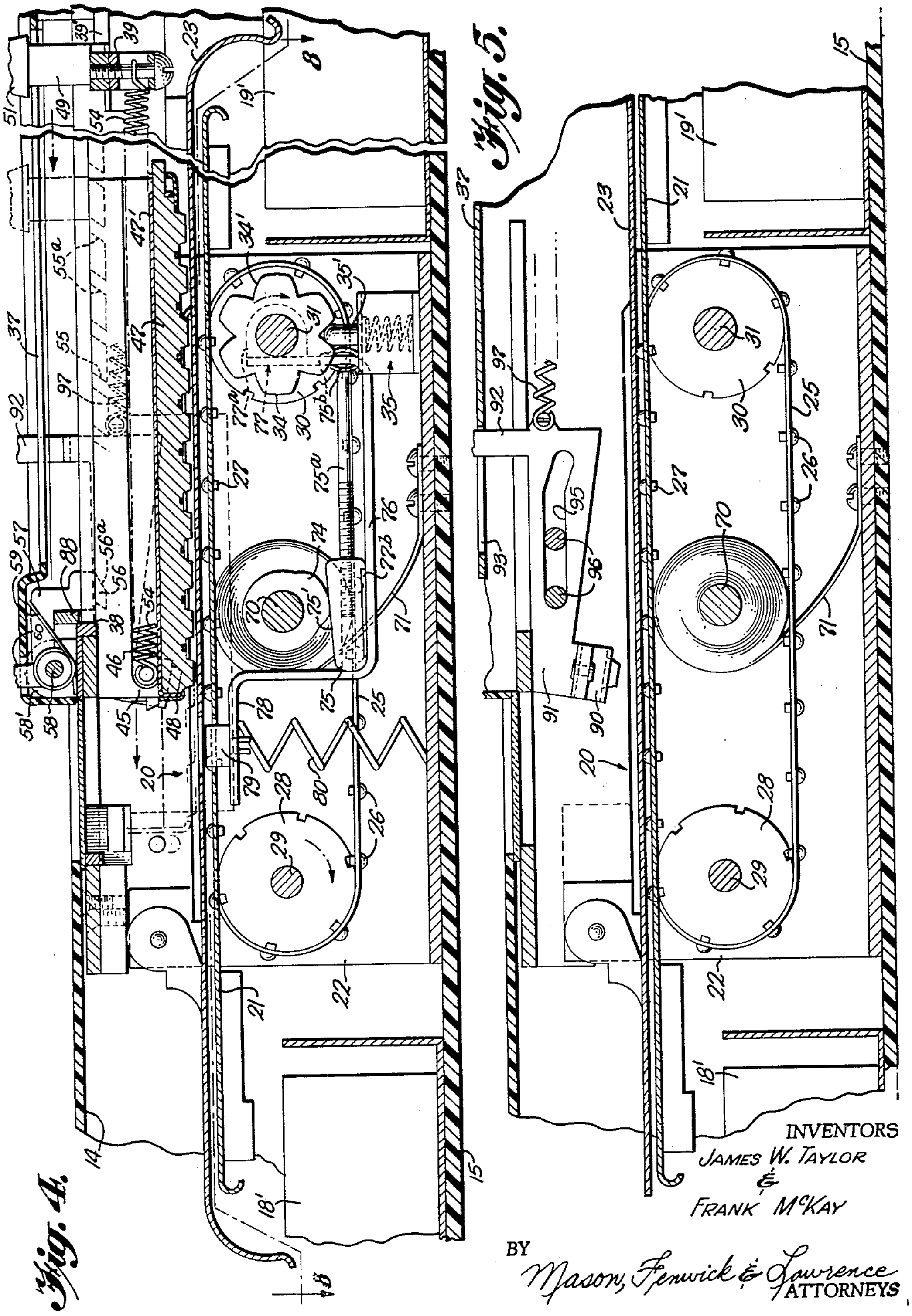
FIGURE 4 is a vertical longitudinal section view taken along the line 4—4 of FIGURE 2.
FIGURE 5 is a vertical longitudinal section view taken along the line 5—5 of FIGURE 2.
Figure 8:
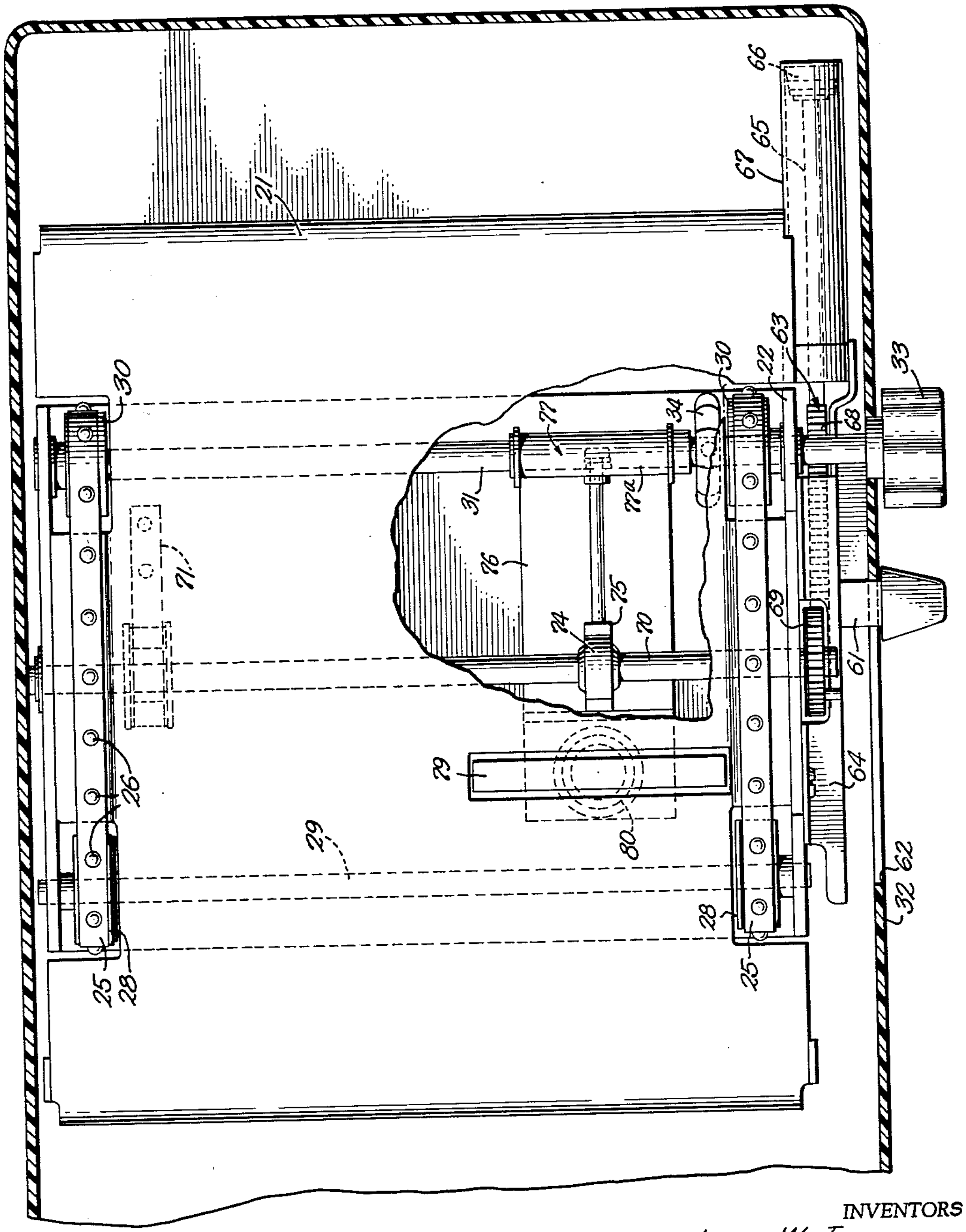
FIGURE 8 is a horizontal section view taken along the section plane indicated by the line 8—8 of FIGURE 4.
Figure 9:
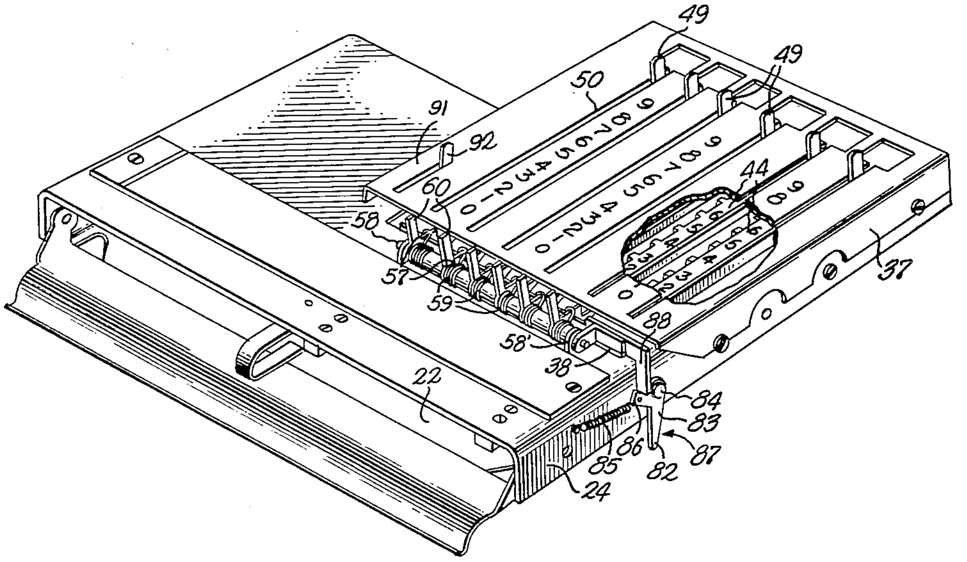
FIGURE 9 is a perspective view of the upper internal subassembly supporting the type bars and associated structure.
Figure 10:
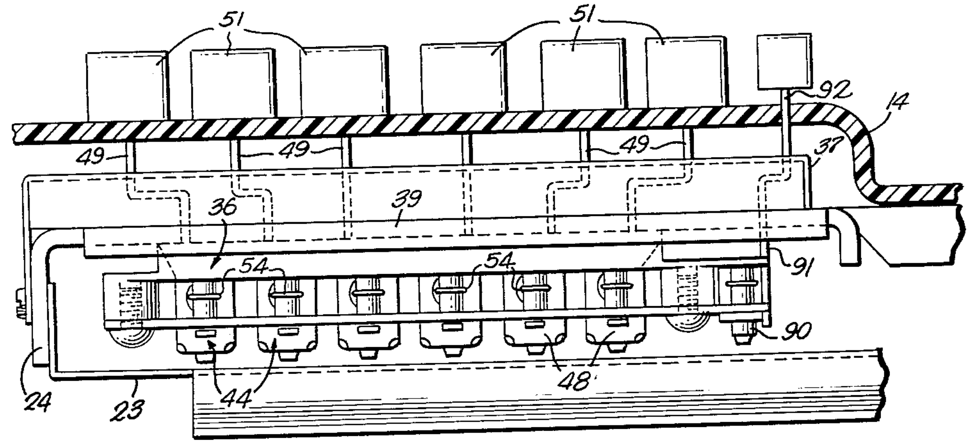
FIGURE 10 is a vertical transverse fragmentary section view to enlarged scale taken along the line 10—10 of FIGURE 3.

The paper 17, which must be provided with marginal perforations along both lateral edges of the paper, is advanced through the printing station 20 by means of a pair of endless belts 25, having substantially spherical knobs 26 thereon which project into the marginal perforations in the paper 17. The belts 25 also have suitable teeth or projections 27 projecting inwardly or in a direction opposite to the knobs 26 to facilitate driving of the belts 25. Both paper feed belts 25 are trained about idler sprockets 28 fixed to an idler shaft 29 journaled in the bottom frame 22 near the lower end of the paper guides 21 and 23, shown to the left in FIGURE 4, and about paper drive sprockets 30 fixed to a paper drive shaft 31 journaled in the bottom frame 22 near the upper end of the paper guides 21 and 23. The paper drive shaft 31 projects through the right-hand side wall 32 of the case 11 and has fixed to the exposed end thereof a manually rotatable indexing knob 33. A paper detent wheel 34 is also fixed to the paper drive shaft 31, for example at a point between the two paper drive sprockets 30, having a plurality of circumferentially spaced, rounded notches 34' therein which cooperate with a corresponding rounded projection or bullet-shaped nose 35' of a spring loaded member 35 supported on the rear wall 15 of the case to index the paper drive shaft 31 and paper drive sprockets 30 so as to achieve proper paper registration. The rounded notches 34' in the periphery of the paper detent wheel 34 are spaced circumferentially so as to permit longitudinal movement or feed of the paper 17 through the printing station 20 a distance corresponding to the normal spacing between successive data imprinting positions on the paper, such as the normal spacing between listing of customer account numbers. By this arrangement, the indexing knob 33 may be actuated to feed the paper either in a forward or a reverse direction, which allows repositioning of the paper 17 to any advance or previous position at will.

A type bar guide frame 36 is supported on the top frame 24 below a cover plate 37, which is likewise fixed to the top frame 24, and includes a pair of transverse end frame members 38, 39 between which extend a plurality of elongated, longitudinal intermediate guide members 40 of generally truncated, triangular section and lateral guide members 41 defining therebetween downwardly opening dovetail slots for slidably receiving dovetail heads 43 of elongated slide bars 44. The slide bars 44 are provided with an enlarged body portion 45 depending from the dovetail heads 43 and having a substantially C-shaped cross section over a major portion of their length to provide a laterally opening elongated slot 46 through the end thereof nearer the lower end of the case 11. The body portions 45 of the slide bars 44 carry self-inking type strips 47, each of which has type faces on the lower surface thereof representing the characters 0 to 9 disposed in longitudinally spaced succession progressing from the lower end of the type strip. Each of the type strips 47 in this embodiment are secured with suitable adhesive in a cartridge 47' in the form of a long narrow, open-sided box, and this type strip and cartridge assembly is secured in position on one of the slide bars 44 by a type strip holder 48. A strip of rubber or felt 39' is mounted on the frame member 39 of the guide frame 36 at the upper end of the frame 36 and in the path of the slide bars 44, and forms a stop for the slide bars 44. The lower transverse end frame member 38 is spaced vertically above the tops of the dovetail heads 43 of the slide bars 44 so that the slide bars can pass thereunder.

Tab members 49 are fixed to the upper ends of each of the slide bars 44 and project through registering elongated slots 50 in the cover plate 37 positioned under an opening 37' in the front wall 14 of the case 11. On the external ends of the tab members 49, knobs 51 are fixed to permit manual shifting of the slide bars 44 along the dovetail slots defined by the guide frame 36 to register the desired type face numeral on the type strips 47 with the printing station. To facilitate manual adjustment of the slide bars 44 to the desired position, the slide bars also carry indicator strips 52 or numeral designations on the upper surfaces of the dovetail heads 43 which will be visible through the window 16 in the region indicated by the reference character 53.

The slide bars 44 are each resiliently biased to the blank or reset position by coil springs 54 fixed at one end to the associated slide bar 44 and at the other end to suitable anchors on the transverse end frame member 39. One side of the dovetail head 43 of each slide bar 44 is provided with a laterally and upwardly opening series of inclined detent notches 55 disposed to receive the tooth 56 of a detent 57 pivoted on a suitable shaft 58 mounted in a bracket 58' fixed to the top frame 24. One detent 57 is provided for each slide bar 44 and is resiliently biased in a clockwise direction as viewed in FIGURE 4 by torsion spring 59 to continuously urge the detent tooth 56 into the notches 55 on the side of the associated slide bar 44. Each of the detents 57 has an upwardly projecting tab 60 extending through a suitable opening therefor in the front wall 13 of the case 11, which may be manually engaged to shift the associated detent 57 in a counterclockwise direction to withdraw the tooth 56 from the notch 55 in which it was seated and release the slide bar to be returned to its reset or blank position by its associated spring 54. It will be noted that the surface **56*a* of each detent tooth 56 is shaped relative to the inclined ends 55*a* of the notches 55 so that the detents 57 will be readily cammed upwardly in a counterclockwise direction by the notch ends 55*a* upon advancement of the slide bars 44 to their manually set positions in response to pressure on the knobs 51**.

Once the slide bars 44 have been adjusted to the desired position to imprint the numerical data on the paper 17 at the printing station 20, as indicated by the numerals on the indicator strips 52 which are in registry with the window portion 53, the printing cycle and resetting of the slide bars 44 is effected automatically in response to actuation of the slidable operator handle 61 on the side of the case 11. The handle 61 projects from the right-hand side wall 32 of the case through a suitable elongated slot 62 therein and is fixed to a rack 63 supported in a rack guide 64 mounted on the bottom frame 22. One end of the rack 63 is fixed to a piston shaft 65 extending from a piston 66 reciprocative in an air cylinder 67 forming a dash-pot mechanism for controlling the printing duration. The rack 63 is provided with teeth 68 which are meshed with the teeth of a main drive gear 69 fixed on a drive shaft 70 journaled on bearings in the bottom frame 22. A spirally wound power spring 71 has one end fixed to the main drive shaft 70 and its other end fixed to a stationary support and is so arranged that it is wound upon itself during the advance stroke of the handle 61 as indicated by the arrow 72, and upon release of the handle 61 at the completion of the advance stroke, the energy in the power spring 71 returns the rack 63 through a return stroke indicated by the arrow 73 at a speed governed by the air cylinder assembly 67. A cam 74 on the drive shaft 70 is engaged by a cam follower block 75 having an inclined plane working surface 75'. The cam follower block 75 is supported on a support 76 having one end 77 rotatably mounted on the paper drive shaft 31 by a supporting block 77*a* fixed to the end 77 and having an offset end portion 78 which supports an anvil 79 disposed at the printing station and resiliently urged upwardly to force the paper 17 at the printing station against the type face on the type strips 47 by anvil spring 80. A shim or spacer 77*b* is provided between the lower end of the block 75 and the support 76 to permit factory setting of the proper height of the anvil 79 at printing time and position in the operating cycle. Additionally, an adjustment screw 75*a* extends through the upwardly projecting portion of the support 76 near the end 77 and through spring clips 75*b* into a threaded bore in the block 75 to permit adjustment in the field of the position of the block 75 along the support 76. The profile of the cam 74 is such that the anvil 79 is permitted to rise under the force of the anvil spring 80 during the terminal portion of the advance stroke and the initial portion of the return stroke of the rack 63 to a sufficient extent to lift the paper against the type strips 47 with sufficient pressure to obtain a transfer of ink to the paper.

Figure 3:
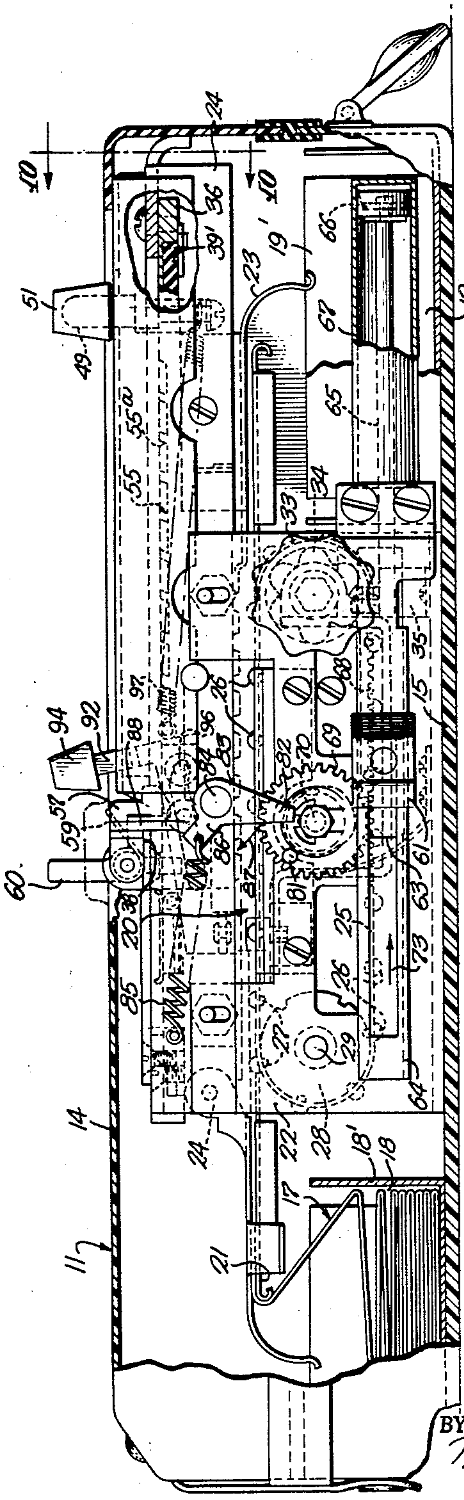
FIGURE 3 is a side elevation of the apparatus with a portion of the casing broken away.
Figure 6:
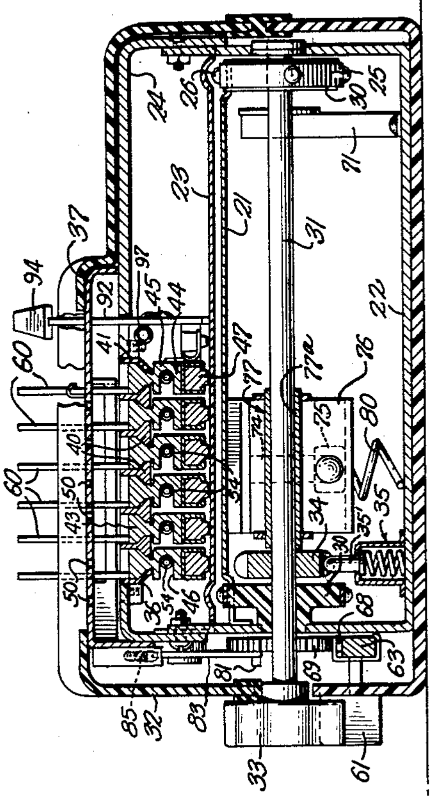
FIGURE 6 is a vertical transverse sectional view taken along the line 6—6 of FIGURE 2.

A slide bar reset pin 81 is also provided on the main drive gear 69, disposed to engage the nose 82 of a tripping lever 83 pivoted on the pivot pin 84 during rotation of the drive gear 69. The tripping lever 83 is biased by the spring 85 to the inactive position illustrated in FIGURE 3, and has an extension 86 which, upon rocking of the tripping lever 83 in a clockwise direction as indicated by the arrow 87, is rotated into engagement with a reset bar 88 pivotally supported on the pin 58 to rock the reset bar 88 upwardly about the pin 58. The reset bar 88, when it rocks upwardly, carries with it all of the detents 57 to withdraw their teeth 56 from the notches 55 in the slide bars 44, thereby releasing all of the slide bars 44 to return under the force of the springs 54 to reset positions.

In the event an error is detected after printing, means are provided for printing an error indicating character "E" beside and in alignment with the erroneously printed numerals. This comprises an error imprinting type strip 90 mounted on an error type mounting slide 91 having a tab 92 projecting upwardly therefrom through a suitable slot 93 in cover plate 37 positioned under an opening in the front wall 14 of the case 11 which is capped by an error button 94. The slide 91 has a slot 95 therein through which extends a pair of fixed guide pins 96. A spring 97 normally biases the error slide 91 to the position illustrated in FIGURE 4 wherein, due to the configuration of the slot 95, the error type strip 90 is elevated upwardly out of contact with the paper 17. When the error button 94 is drawn toward the left as viewed in FIGURE 4, the error type strip 90 is shifted both to the left and downwardly to bring the error type strip 90 into contact with the paper 17 in transverse alignment with the group of imprinted characters registering with the viewing window 16 to imprint the character "E" beside the erroneously imprinted group of numbers.

In the operation of the data imprinting device, it will be apparent that the operator, after manually adjusting the manual indexing knob 33 to bring, for example, the preprinted data setting forth the name, address and account number of the public utility customer into registry with the viewing window 16, will grasp the slide bar knobs 51 and shift them along the direction of the slots provided in the cover plate 37 positioned under an opening in the front wall 14 of the case 11 for the tabs 49 to position the slide bars at appropriate longitudinally adjusted positions as determined by the numerals visible through the window portion 53 to depict the meter reading for the customer designated by the preprinted data. The detents 57 will of course resiliently restrain the slide bars 44 in their manually adjusted positions. The operator then forces the handle 61 downwardly through its full advance stroke and releases the handle 61. During the advance stroke movement of the rack 63, the power spring 71 is tensioned by rotation of the main drive gear 69 and drive shaft 70. If the main drive gear 69 during the advance stroke of the rack 63 is moving in a clockwise direction as viewed in FIGURE 4, the reset pin 81 will not actuate the tripping lever 83 to release the detents 59, since the reset pin 81 will merely engage the nose 82 and force the tripping lever 83 in a counterclockwise direction about its pivot until the reset pin 81 passes beneath the nose 82. Upon release of the handle 61, the energy stored up in the spring 71 will drive the drive shaft 70 and its associated gear 69 and cam 74 in a counterclockwise direction as viewed in FIGURE 4. During the terminal portion of the advance stroke and the initial portion of the return stroke, the cam 74 permits the anvil support arms 76 to rise, allowing the spring 80 to propel the anvil 79 against the paper 17 at the printing station 20 and supply appropriate pressure through the paper to the self-inked type face on the strips 47 aligned with the printing station to effect a transfer of ink to the paper. Near the conclusion of the return stroke of the rack 63, the reset pin 81 on the main drive gear 69 now moving in a counterclockwise direction engages the nose 82 of the tripping lever 83 and forces the tripping lever in a clockwise direction to engage the reset bar 88 and effect release of the detents 56 from the detent notches 55 of the slide bars 44, permitting the slide bars to return to reset position.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Portable data imprinting apparatus for mechanically imprinting characters representative of meter readings and like variable data requiring human notation on a record tape comprising an elongated case having a printing station including a laterally extending line of character printing positions transversely spanning a portion of the case, tape feed means for intermittently advancing a record tape along a feed path axis extending longitudinally of the case through said printing station, settable character imprinting means comprising a plurality of elongated imprinting bars within said case slidably supported for axial movement along parallel adjustment axes paralleling said feed path axis through said line of printing positions, each of said type bars having a columnarly disposed series of character type faces, a tab member projecting from each of said type bars to an accessible position externally of the case to be manually adjusted for shifting any selected one of the character type faces on the type bars in registry with said character printing positions, means for releasably restraining said type bars at their adjusted positions, means for visibly indicating the character type faces disposed in registry with said character printing position, a handle member manually operative through a predetermined stroke, anvil means biased to a printing position to press the record tape at the character printing positions into engagement with the character type faces registering therewith for transferring an imprint of such character type faces to the record tape and normally restrained at an inactive position spaced from said tape printing positions, type bar resetting means for returning said type bars to a selected reset position, and means controlled by movement of said handle member through its stroke for sequentially releasing said anvil means from said inactive position into imprint producing engagement with said type faces, withdrawing the anvil means therefrom, and actuating said type bar resetting means to return the type bars to the selected reset position.

2. Portable data imprinting apparatus for mechanically imprinting characters representative of meter readings and like variable data on a record tape comprising an elongated case having first and second tape storage stations spaced from each other, a printing station intermediate said first and second storage stations including a laterally extending line of character printing positions, tape feed means for intermittently advancing the record tape from one of said storage stations along a selected feed axis through said line of printing positions to the other storage station, settable character imprinting means comprising a plurality of elongated type bars slidably supported in said casing for axial movement along parallel adjustment axes and each including a rigid tab extension projecting to an accessible location for manual adjustment of the bars individually to selected axial positions, each of said bars having a columnarly disposed series of spaced character type faces thereon to be selectively positioned at said line of character printing positions, means for releasably holding said type bars at their adjusted positions, a handle member operative through a preselected stroke, means controlled in accordance with movement of said handle member through its stroke for sequentially forcing the record tape at said printing station into engagement with the type faces registered with said line of character printing positions to produce an imprint thereof on the record tape and returning said type bars to a selected reset position, and an independently manually operable error type member having an error symbol type face thereon supported in said casing for movement from a normal inactive position spacing its type face from the record tape to an active position pressing its type face into printing contact with the record tape at a position spaced along the direction of tape travel from said line of character printing positions.

3. In portable data imprinting apparatus, the combination defined in claim 1 wherein said stroke of said handle member includes an advance stroke portion in one direction and a return stroke portion in another direction, and said means controlled by movement of said handle member includes a dashpot means operative during the return stroke of the handle member for regulating the duration of the return stroke.

4. In portable data imprinting apparatus, the combination defined in claim 1, wherein said type bars comprise a lower body portion of substantially C-shaped cross section over the major portion of their length providing a flat horizontal bottom surface and one flat vertical side surface, and having an elongated slot opening through the opposite side surface and extending longitudinally of the body portion from a location intermediate the longitudinal ends thereof through one longitudinal end of the body portion, a coil spring for each slide bar for biasing the slide bar toward a selected reset position lying within said slot wholly between the side walls of the body portion, and said slide bars further comprising an upper head portion integral with said body portion having a dove-tail cross section providing downwardly and inwardly converging side wall portions along said head portion, and said case having means defining elongated dove-tail slots slidably receiving and supporting said head portions of said type bars.

5. In portable data imprinting apparatus, the combination defined in claim 1, wherein said anvil means comprises a rigid elongated anvil support pivotally supported adjacent one end thereof about a stationary axis within the case and carrying an anvil block on the opposite end thereof, spring means continuously bearing upwardly against said opposite end portion for biasing the anvil block into imprint producing engagement with the record tape, rotatable cam means having a lobe thereon normally positioned to restrain said anvil support against the force of said spring at a location spacing said anvil block below the imprint producing position and rotatable to a position releasing said anvil support to produce an imprint on the record tape, a cam follower block on said anvil support having an inclined surface in engagement with the periphery of said cam means, and adjustment means for shifting said cam follower block in a direction transverse to the axis of rotation of said cam means to regulate the movement of said anvil block responsive to said cam means.

6. Portable data imprinting apparatus for mechanically imprinting characters representative of meter readings and like variable data on a record tape comprising an elongated case having first and second tape storage stations spaced from each other, a printing station intermediate said first and second storage stations including a laterally extending line of character printing positions, tape feed means for intermittently advancing the record tape from one of said storage stations along a selected feed plane through said line of printing positions to the other storage station, settable character imprinting means comprising a plurality of elongated type bars slidably supported in said casing for axial movement along parallel adjustment axes located in a plane closely adjacent to said feed plane and each including a rigid tab extension projecting to an accessible location for manual adjustment of the bars individually to selected axial positions, each of said bars having a columnarly disposed series of spaced character type faces on a lower side thereof adjacent the feed place to be selectively positioned at said line of character printing positions, said case including a front wall having a first viewing window portion therein, said type bars having an upper side adjacent said front wall, a set of character indicating markings on said upper side of said type bars arranged in selected relation to the positions of said type faces on the associated type bar and to said first viewing window portion to register with said first viewing window portion and produce a visual indication of the associated type face aligned with said character printing positions upon axial adjustment of the type bars, detent means for releasably holding said type bars at their adjusted positions, handle means operative through a predetermined stroke, means responsive to actuation of said handle means through its stroke for pressing the record tape at the printing station into engagement with the character type faces registering with said character printing position for transferring an imprint of such character type faces to the record tape, said tape feed means including indexing means for advancing the record tape through a uniform selected increment of travel upon each actuation of said tape feed means, and a second viewing window portion in said front wall spaced from said line of character printing positions in preselected relation to said increment of travel to register with the character imprint produced by a printing cycle just preceding the last incremental advancement of the tape and permit viewing of such record tape imprint, and means for indicating on the record tape an error of printing comprising an error symbol type face, a carrier bracket for said error symbol type face supported for movement from a normal inactive position wherein the error symbol type face is spaced from the record tape to an active position wherein the error symbol type face is pressed into imprint transferring contact with the record tape at a position beside and on a line with the character imprint registering with said second viewing window portion, said carrier bracket having an extension tab projecting through said front wall to an accessible position for manual manipulation of said carrier bracket.

7. Portable data imprinting apparatus for mechanically imprinting characters representative of meter readings and like variable data on a record tape comprising an elongated case having first and second tape storage stations spaced from each other, a printing station intermediate said first and second storage stations including a laterally extending line of character printing positions, tape feed means for intermittently advancing the record tape from one of said storage stations along a selected feed plane through said line of printing positions to the other storage station, said tape feed means including indexing means for advancing the record tape through a uniform selected increment of travel upon each actuation of said tape feed means, settable character imprinting means comprising a plurality of elongated type bars slidably supported in said casing for axial movement along parallel adjustment axes located in a plane closely adjacent to said feed plane and each including a rigid tab extension projecting to an accessible location for manual adjustment of the bars individually to selected axial positions, each of said bars having a columnarly disposed series of spaced character type faces on a lower side thereof adjacent the feed plane to be selectively positioned at said line of character printing positions, said case including a front wall having a viewing window therein spaced from said line of character printing positions in preselected relation to said increment of travel to register with the character imprint produced by a printing cycle just preceding the last incremental advancement of the tape and permit viewing of such record tape imprint, and means for indicating on the record tape an error of printing comprising an error symbol type face, a carrier bracket for said error symbol type face supported for movement from a normal inactive position wherein the error symbol type face is spaced from the record tape to an active position wherein the error symbol type face is pressed into imprint transferring contact with the record tape at a position beside and on a line with the character imprint registering with said viewing window, said carrier bracket having an extension tab projecting through said front wall to an accessible position for manual manipulation of said carrier bracket.

8. Portable data imprinting apparatus for mechanically imprinting multidigit numbers representative of meter readings and like variable data on a record tape in selected positions relative to customer name and identifying indicia preprinted on the tape comprising an elongated case having first and second tape storage stations spaced from each other, a printing station intermediate said first and second storage stations including a laterally extending line of digit printing positions extending laterally of a selected tape feed axis, tape feed means for intermittently advacing the record tape from one of said storage stations along a tape feed axis in a selected planar feed path through said line of printing positions to the other storage station, settable numeric imprinting means comprising a plurality of elongated imprinting bars within said case slidably supported for axial movement along adjustment axes parallel to said tape feed axis through said line of printing positions, each of said type bars having a columnarly disposed series of numeric type faces, a tab member projecting from each of said type bars to an accessible position externally of the case to be manually adjusted for shifting any selected one of the numeric type faces on the type bars into registry with said digit printing positions, said case including a front wall having a viewing window means therein and an adjoining said wall, said type bars having an upper side adjacent said front wall, a set of numeric indicating markings on said upper side of said type bars arranged in selected relation to the positions of said type faces on the associated type bar and to said viewing window means to register with said viewing window means and produce a visual indication of the associated type face aligned with said digit printing positions upon axial adjustment of the type bars, detent means for releasably holding said type bars at their adjusted positions, a rectilinearly reciprocative handle member slidably mounted in said side wall for movement through an advance stroke, resilient means for storing energy during said advance stroke and driving said handle member through a return stroke, anvil means normally occupying a position spaced from the record tape at said printing station for pressing the record tape into engagement with the numeric type faces registering with said line of digit printing positions to transfer an imprint of such numeric type faces to the record tape, resilient means normally biasing said type bars to a blank reset position, detent tripping means for actuating said detent means to release all of said type bars to be returned to their blank reset position, driven means controlled by movement of said handle member for actuating in preselected timed relation said anvil means and said detent tripping means to produce a record imprint of the numeric type faces aligned with the line of digit printing positions onto the record tape during a terminal portion of said advance stroke and an initial portion of said return stroke and then release the type bars to return to their blank reset positions, and means for regulating the duration of the imprinting period during said return stroke.

9. Portable data imprinting apparatus for mechanically imprinting multidigit numbers representative of meter readings and like variable data on a record tape in selected positions relative to customer name and identifying indicia preprinted on the tape comprising an elongated case having first and second tape storage stations spaced from each other, a printing station intermediate said first and second storage stations including a laterally extending line of digit printing positions extending laterally of a selected tape feed axis, tape feed means for intermittently advancing the record tape from one of said storage stations along a tape feed axis in a selected planar feed path through said line of printing positions to the other storage station, settable numeric imprinting means comprising a plurality of elongated imprinting bars within said case slidably supported for axial movement along adjustment axes parallel to said tape feed axis through said line of printing positions, each of said type bars having a columnarly disposed series of numeric type faces, a tab member projecting from each of said type bars to an accessible position externally of the case to be manually adjusted for shifting any selected one of the numeric type faces on the type bars into registry with said digit printing positions, said case including a front wall having a viewing window means therein and an adjoining side wall, said type bars having an upper side adjacent said front wall, a set of numeric indicating markings on said upper side of said type bars arranged in selected relation to the positions of said type faces on the associated type bar and to said viewing window means to register with said viewing window means and produce a visual indication of the associated type face aligned with said digit printing positions upon axial adjustment of the type bars, detent means individual to each of said type bars for releasably holding said type bars at their adjusted positions, a rectilinearly reciprocative handle member slidably mounted in said side wall, anvil means normally occupying a position spaced from the record tape at said printing station for pressing the record tape into engagement with the numeric type faces registering with said line of digit printing positions to transfer an imprint of such numeric type faces to the record tape, resilient means normally biasing said type bars to a blank reset position, a detent tripping lever for actuating said detent means to release all of said type bars to be returned to their blank reset positions, a rack intercoupled with said handle member to be driven by the latter in an advance stroke direction along a rectilinear path, a gear intercoupled with said rack to be driven thereby, a shaft fixed to said gear having a spring secured at one end to said shaft and fixed at the other end to a stationary anchor to be tensioned by rotation of said shaft responsive to movement of said rack and handle member through said advance stroke, said spring being operative upon release of said handle member at the conclusion of said advance stroke to drive said shaft and gear in a direction to return said rack and handle member through a return stroke to a normal position, dashpot means intercoupled with said rack and operative during the return stroke thereof for regulating the duration of the return stroke, a cam fixed to said shaft having a profile engaging said anvil means normally restraining said anvil means at said position spaced from the record tape and shaped to release said anvil means to be pressed into engagement with the record tape and produce said imprint, and means rotatable in fixed relation with said cam for engaging said detent tripping lever during the return stroke of said rack and when said anvil means is spaced from the record tape to release the type bars to return to their blank reset positions.

References Cited in the file of this patent

UNITED STATES PATENTS

| | | |
|---|---|---|
| 923,085 | Smith | May 25, 1909 |
| 1,818,338 | Kropff | Aug. 11, 1931 |
| 1,960,560 | Todd et al. | May 29, 1934 |
| 2,108,400 | Barker-Bland | Feb. 15, 1938 |
| 2,264,855 | Pasinski | Dec. 2, 1941 |
| 2,271,073 | Harris | Jan. 27, 1942 |
| 2,281,577 | Haynes | May 5, 1942 |
| 2,328,861 | Thomas | Sept. 7, 1943 |
| 2,414,895 | Reynolds et al. | Jan. 28, 1947 |
| 2,687,088 | Hennessy et al. | Aug. 24, 1954 |